3,809,635
METHOD OF INCREASING THE ADHESION OF A METAL BODY SURFACE TO RUBBER

Jacques Gillot and Benno Lux, Geneva, Switzerland, assignors to Battelle Memorial Institute, Carough, Geneva, Switzerland
No Drawing. Filed Nov. 4, 1971, Ser. No. 195,855
Claims priority, application Switzerland, Nov. 18, 1970, 17,152/70
Int. Cl. C23b *1/00;* C23c *15/00*
U.S. Cl. 204—192                               2 Claims

ABSTRACT OF THE DISCLOSURE

A method of increasing the adhesion of the surface of a metal body, particularly steel wire, to rubber and vice versa by coating the surface of the metal body with a carbon layer firmly adhering thereto. The carbon layer may be applied by evaporation of carbon under vacuum or by subjecting the surface of the metal body to a corrosive treatment to remove the metal from the surface portion while leaving the carbon.

FIELD OF THE INVENTION

This invention relates to a method of increasing the adhesion of a metal-body surface to rubber.

BACKGROUND OF THE INVENTION

The problem of improving the adhesion of a metal body surface to rubber is frequently encountered in industry, particularly for improving the efficiency of metal reinforcements in rubber articles such as tires.

In tire production there has recently been a trend toward the more and more increased use of steel wire as reinforcing elements for tires. The use of such wire permits the excellent mechanical properties, which are required to ensure high performance of most modern automobiles, to be obtained.

However, the use of such steel-wire reinforcements requires sufficient adhesion of the rubber to the wire to enable these excellent mechanical properties to be utilized to the best advantage.

In fact, normally the capability of steel to adhere to rubber, particularly the rubber mixtures normally used for the production of tires, is relatively small or at any rate insufficient to satisfy the above-mentioned requirements.

Hitherto the solution adapted to solve this problem has consisted in coating the steel wires with a thin surface layer of brass and incorporating in the rubber mixture components improving its adhesion to the brass layer, for example, complex salts of cobalt and organic resins. However, this method has the drawback of being expensive. Further, the above-mentioned components in the rubber mixture have a disadvantageous effect on other properties of the tires produced in this manner.

OBJECT OF THE INVENTION

Thus, it is the object of the present invention to provide a method of improving the adhesion of a metal-body surface to rubber without modifying the composition of the rubber and, in particular, to provide a method of improving the adhesion of the metal wires used for reinforcing tires to the rubber mixtures which are normally used for tire production, without having to incorporate a special component in these rubber mixtures to improve their adhesion to the metal wires.

SUMMARY OF THE INVENTION

This object is achieved according to the present invention by coating the metal body surface with a carbon layer firmly adhering thereto.

Thus, the invention is based on the surprising discovery that the provision of a carbon layer on a metal surface, whose capability of adhesion to rubber is meager without the carbon layer, considerably increases such capability of adhesion without having to add special components to the rubber.

To achieve this purpose a very thin carbon layer is sufficient; for example, the thickness of the carbon layer may be in the order of 10 to 500 A. to provide the desired effect. However, at present no exact data is available from which an upper and a lower limit for the useful thickness of the carbon layer can be established.

The method of the present invention can be applied not only for coating steel wires but also for coating steel bodies of shapes other than those of wires, for example, plates, bands, tubes, etc., and for coating variously shaped bodies of other metals.

According to one embodiment of the method, which may be used for coating metal bodies containing carbon as well as metal bodies containing no carbon, the carbon layer is applied to the surface of the metal body by evaporation under vacuum in an appropriate chamber. To obtain the highest degree of improvement of adhesion the procedure may be as follows:

Immediately after the vapor deposition of the carbon layer at least one gas selected from the group consisting of hydrogen and gaseous hydrocarbons is introduced into the vacuum chamber at ambient temperature and this gas is maintained at atmospheric pressure or nearly atmospheric pressure in contact with the carbon layer for a time sufficient to saturate the carbon layer. Before the rubber intended to adhere to the metal body is applied thereto, prolonged contact of the metal body thus treated with oxygen containing atmosphere must be avoided. For this purpose immediately after the treatment of the metal body for increasing its adhesion is is finished, the metal body is coated with the rubber which it is designed to reinforce or at least a rubber layer of the same kind as or compatible with this rubber.

As to the vacuum, evaporation device, any known device may be used which permits heating of a pure carbon body to a temperature in the order of 3000° K under a pressure of the order of $10^{-5}$ torr and maintaining this body at this temperature for a time sufficient to effect the deposition of a carbon layer of the desired thickness on the surface of the metal.

For example, an electric arc produced between two carbon electrodes or a carbon bodyy heated by Joule effect may be used, working in both cases under a high vacuum of at least $10^{-5}$ torr. A cathode pulverization or sputtering device working under a vacuum of less than $10^{-5}$ torr may likewise be used.

The method as described above may be carried out discontinuously or continuously. The continuous method is particularly advantageous especially if the metal body to be treated is very long such as is normally the case with wires or bands.

To ensure good adhesion of the carbon layer to the surface of the metal body, this surface must be completely clean and degreased. For this purpose the metal surface may be previously degreassed, if required, by some appropriate solvent or mixture of solvents, for example, acetone. Instead of or in addition to the chemical cleaning of the surface of the metal body it may be subjected to an ion bombardment, for example, by an electric discharge in an inert gas atmosphere under a low pressure (for example, $10^{-3}$ torr), this electic discharge being produced by the application of a sufficient differential potential of, for example 500 volts, between the metal body used as a negative electrode and an appropriate positive electrode.

As an alternative to this technique the carbon evaporation under vacuum may be replaced by the application of a carbon layer by decomposition of a gaseous compound containing carbon, such as a hydrocarbon, carbon disulphide, halogenated carbon compound, $C_3O_2$, etc., by bringing such compound into contact with the surface of the metal body which is heated to a sufficient temperature, for example, to above 600° C. Obviously this alternative cannot be used if the metal body is harmfully affected by this temperature. When this is the case, as it will be with steel wires designed to reinforce the carcass of tires, when the wires are produced by drawing and consequently heavily stretched so that they would lose part of their mechanical strength by annealing, it is preferable to use the method described earlier in which the carbon layer is applied by evaporation under vacuum.

According to another embodiment of the method, which may be applied to metals and metal alloys containing carbon, particularly steel, the carbon layer is formed on the surface of the metal body by subjecting the metal body to a corrosive treatment affecting the metal body to a certain depth from its surface and permitting to remove at least the major portion of the metal, i.e. the iron in the case of steel, while the carbon is being retained.

This corrosive treatment may preferably consist of an electrolytic treatment in an electrolytic bath in which the metal body to be treated is used as the anode. The electrolytic bath may be, for example, an aqueous solution of an acid, particularly an aqueous solution of dilute hydrochloric acid, for example, 0.1 N. hydrochloric acid, or a saline solution. In this case the treated body is preferably dried in an appropriate atmosphere, for example, hot air, before the rubber is applied to its surface.

As in the case of the first embodiment of the method, the operations may be carried out discontinuously or continuously. In the latter case an elongated metal body such as a wire or band may be fed continuously through a chemical cleaning bath, a corrosive electrolytic bath, one or more cleaning baths, a drying chamber, the apparatus in which the metal body is utilized, namely in the case of steel wires the apparatus for producing tire carcasses, and into the apparatus for the production of tires by coating the carcasses with a rubber mixture and subsequent molding and vulcanizing of the latter.

The electrolytic bath may be replaced by a chemical corrosive treatment in a liquid or gaseous medium.

The following examples show how the method of the present invention may be carried out in practice.

EXAMPLE 1

A piece of carbon steel wire of the type normally used for reinforcing tire carcasses, having a high mechanical strength and a carbon content of 0.7% by weight with a diameter of 0.2 mm. and a length of 10 cm. is degreased by immersing it into an acetone bath and then drying it with a clean wool cloth.

The piece of wire is then stretched by securing it with its ends to a support arm constructed so that the axis of the wire extends in a vertical direction while the support itself is movable also in a vertical direction to thereby shift the wire along a guide rod so that during this movement the wire will pass at a known predetermined speed between two electric arcs of carbon electrodes at a distance of 3 mm. from each of the electrodes. The entire assembly of this device is disposed within a chamber in which a vacuum of $10^{-5}$ to $10^{-6}$ torr can be produced and which is further provided with an argon supply device. The chamber is further provided with a device for bombarding the stretched wire with ions by producing a differential potential between the wire, which serves as the negative electrode, and an appropriate positive electrode in an argon atmosphere at low pressure.

The wire is subjected to this ion bombardment for 5 minutes with a differential potential of 500 volts and a current intensity of 50 ma. at a pessure of $10^{-3}$ torr in the argon atmosphere to further increase the degree of cleanliness of the wire surface. Then the argon is removed until the pressure in the chamber is brought to $10^{-5}$ torr, the electric arcs are switched on, and the wire is passed between these arcs at a speed of 1.5 meters per second. In this manner a carbon layer is deposited on the wire with an average thickness of 10 angstroms as calculated by extrapolation from optical interferometric measurement (according to the Michelson method) of the thickness of a carbon layer deposited under the same conditions in a known time on a glass plate placed in a fixed position at a distance of 36 mm. symmetrically above the arcs.

When the wire is covered with the carbon layer the electric arcs are switched off and when the arcs have cooled, without previously removing the vacuum from the chamber, hydrogen is admitted thereto until atmospheric pressure is reached again. The wire is left in this hydrogen atmosphere for one hour. The adhesion of the wire to rubber obtained by this method is excellent as shown by the following conventional test.

After treatment of the wire in the hydrogen atmosphere is finished the wire is rapidly coated with a rubber test piece which does not contain any additive of the type normally used to increase the adhesion of rubber to brass and which previously has been rolled in two passes at 45° C. and 80° C. Then the test piece is vulcanized in the conventional manner at a temperature of 143° C. for a period of 1 hour and formed into cylinder having a length of 6 mm. and a diameter of 3.5 mm. with the carbon layer coated steel wire located exactly in the vertical axis of the cylinder. The rubber test piece had the following composition (in parts by weight):

| | |
|---|---|
| Natural rubber | 100 |
| Zinc oxide | 5 |
| Stearic acid | 3 |
| Amine antioxidant | 1.5 |
| Carbon black | 50 |
| Pine tar | 3 |
| Benzothiazyl disulphide | 1.4 |
| Sulphur | 2.8 |

12 hours after the preparation of the test piece thus produced it is subjected to a tensile test by applying to the axis of the wire a known increasing force which tends to tear off the rubber test piece. This tensile test is carried out in a tensile testing machine having a pair of clamping jaws one of which is clamped to the free end of the steel wire while the other carries a device which permits the rubber test piece to be retained without clamping it laterally but merely by holding it perpendicularly to the wire axis without interfering with the force tending to tear off the rubber test piece.

With a pulling speed of 5 cm./min. the force necessary to pull off the steel wire is 7 kg.

The testing method described above and the apparatus used for carrying out this testing method are described, for example, in the following article: "Improvement of the Testing Method for Adhesion of Vulcanized Rubber to Steel Wire Cords" by S. Eccher and C. Canevari, Kautschuk- und Gummi-Kunststoffe 22 (1969), vol. 5, pp. 228–232.

By way of comparison several similar tensile tests have been carried out with steel wire pieces the same as above described, but not subjected to any carbonizing treatment and coated with a rubber test piece of the same type as described above. In these tests the steel wires were pulled off the rubber test pieces by a force varying between 0.1 and 0.4 kg.

Other similar tests were carried out with untreated steel wires of the same type but with rubber test pieces prepared from a mixture containing additives for increasing the adhesion of the rubber to brass. In these tests the force necessary to pull off the steel wires from the rubber test pieces was between 2.2 and 4.8 kg.

Further tests were carried out on steel wires of the same diameter but coated with a brass layer to a thickness of 5 microns. These steel wires were coated with rubber containing additives designed to increase its adhesion to brass. The force necessary to pull off these wires from the rubber was between 7 and 8 kg.

Thus, the above-described example of carrying out the method of the present invention shows that this method, without using additives to the rubber, yields an adhesion of the rubber to the steel wires which to all intents and purposes is as good as the adhesion obtained by using rubber containing special additives and coating the steel wires with a brass layer.

It is also to be noted that the method of the present invention is particularly advantageous because at present steel wires often are not produced by extrusion or drawing but, for example, by continuous casting and the operation of coating the steel wire surface with a superficial brass layer is in this case less economical than with the previously employed production methods.

EXAMPLE 2

A carbon steel wire of the same type as used in Example 1 is carefully degreased with acetone. This wire is then subjected to an electrolytic corrosive treatment in an electrolytic bath formed by an aqueous solution of 0.1 N hydrochloric acid at a temperature of 20° C. with a current density of 0.16 ampere per square centimetre for 5 seconds. For this purpose the steel wire is used as the anode while a cathode of copper is used. Between the anode and cathode a differential potential of 12 volts is applied.

On the portion of the wire subjected to the electrolytic treatment a blackening is observed which may be attributed to the formation of a surface layer of amorphous carbon of a thickness of 100 A. The wire is then withdrawn from the electrolytic bath, rinsed with water to remove the acid, then rinsed with ethyl alcohol to remove the water, and finally the carbon layer is dried for 75 minutes by air heated to 120° C. In this manner the carbon layer is hardened and strongly adheres to the wire surface.

The improvement of the adhesion of the wire to rubber was ascertained by the same conventional test as described in Example 1. The force necessary to pull off the wire was 6 kg.

EXAMPLE 3

The same procedure as in Example 1 is adopted but with the use of a stainless austenitic steel wire having a diameter of 0.2 mm. and the following composition (in weight percent):

| | |
|---|---|
| Carbon | 0.15 |
| Chromium | 18 |
| Nickel | 8 |
| Manganese | 2 |
| Silicon | 1 |
| Iron | 70.85 |

The force necessary to pull off the wire was 6 kg. A comparative test made with a similar steel wire not covered with carbon revealed a force of 0.2 kg. required to pull off the wire.

EXAMPLE 4

The same procedure as in Example 1 is adopted but with the use of a stainless ferritic steel wire having a diameter of 1 mm. and the following composition (in weight percent):

| | |
|---|---|
| Carbon | 0.12 |
| Chromium | 16 |
| Manganese | 1 |
| Silicon | 1 |
| Iron | 81.88 |

The improvement of the adhesion of the wire to rubber was ascertained by the same conventional test as described in Example 1. The force necessary to pull off the carbon coated wire was 8 kg. To pull off a similar wire not coated with carbon a force of 0.2 kg. was sufficient.

We claim:

1. A method of making a composite article comprising the steps of coating a metal-body surface with an elemental carbon layer firmly adhering thereto by vapor deposition in an evacuated chamber; and bonding a rubber to the resulting carbon-layer-coated surface.

2. The method defined in claim 1, wherein immediately after the coating of the carbon layer onto the body and before bonding of said rubber thereto at least one gas selected from the group consisting of hydrogen and gaseous hydrocarbons is admitted to said chamber at ambient temperature and this gas is maintained at approximately atmospheric pressure in contact with the carbon layer for a time sufficient to saturate the carbon layer.

References Cited

UNITED STATES PATENTS

| | | | |
|---|---|---|---|
| 2,382,081 | 8/1945 | Luacas et al. | 117—49 |
| 2,718,485 | 9/1955 | Samuely | 117—49 |
| 3,489,625 | 1/1970 | Dell | 117—49 |
| 2,315,798 | 4/1943 | Koether | 204—140 |
| 1,880,937 | 10/1932 | Elsey | 117—49 |

THOMAS TUFARIELLO, Primary Examiner

U.S. Cl. X.R.

117—49; 204—129.75